Dec. 5, 1950  P. M. D'AMICO  2,532,394
LINE HOLDER
Filed June 1, 1945
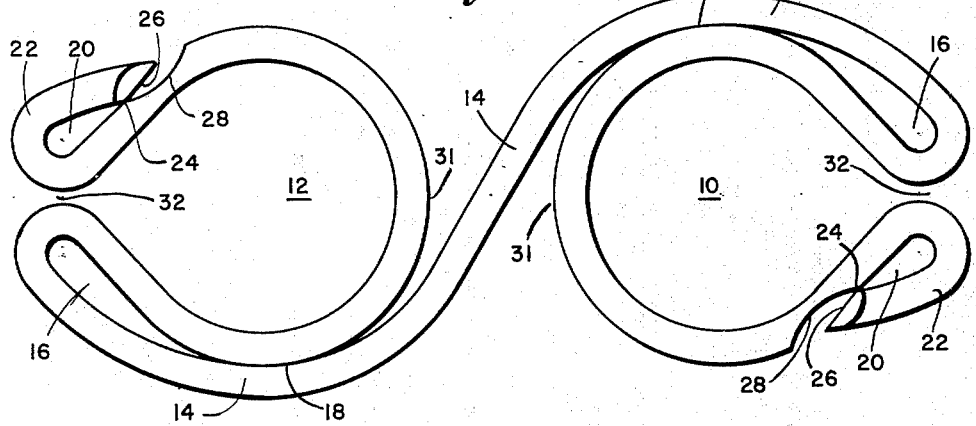
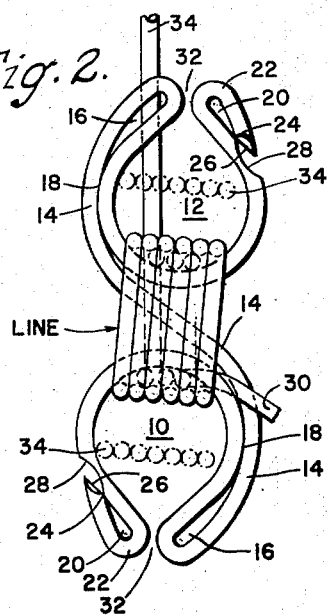
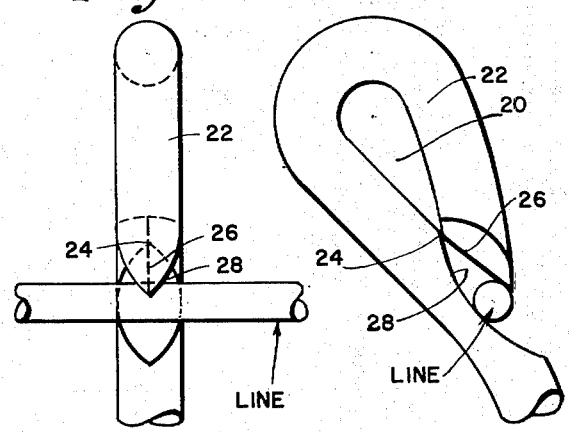
INVENTOR
Paul M. D'Amico
BY Louis Necho
ATTORNEY

UNITED STATES PATENT OFFICE 2,532,394

LINE HOLDER

Paul M. D'Amico, Philadelphia, Pa.

Application June 1, 1945, Serial No. 597,104

2 Claims. (Cl. 242—96)

My invention relates to a line holder of the type used by operators in lacing electrical cords, or by masons for holding a plumb line, or for holding, paying out, or reeling in twine or other flexible strands for sundry uses or purposes.

One object of the invention is to produce an improved line holder of the type set forth.

A further object is to produce a line holder which facilitates the winding of a line thereon, and the unwinding of the line therefrom, but which, also, prevents accidental or unintended unwinding of the line, without any effort, skill or attention on the part of the operator.

A still further object is to produce an improved line holder which is sufficiently rigid but which is also light and inexpensive.

These and other objects are attained by my invention as set forth in the following specification and as illustrated in the accompanying drawing, in which:

Fig. 1 is a plan view of a line holder embodying my invention.

Fig. 2 is a reduced view, similar to Fig. 1, but showing a line partly wound upon the holder.

Fig. 3 is an enlarged, fragmentary plan view of one of the end loops formed at diagonally-opposed extremities of the holder, as shown in Fig. 1.

Fig. 4 is an enlarged, fragmentary, elevational view showing the manner in which a line may be severed by a cutter forming a part of the end loop.

The line holder of my invention is preferably formed of a continuous piece of wire which is preferably somewhat springy and which is bent to form two main end loops 10 and 12 disposed at the opposite ends of a substantially S-shaped portion 14. The junctions of the ends of the S-shaped member 14 with the corresponding loops 10 and 12 form relatively narrow U-shaped auxiliary loops 16 and the oppositely-curved portions of the S-shaped member form cradles or abutments for the loops 10 and 12 as shown at 18.

The ends of the loops 10 and 12 are bent to form relatively narrow U-shaped loops 20 the limbs of which converge so that the extremities 22 of the outer limbs abut against the adjacent portions of the inner limbs of the loops 20 as at 24. The extremities of the ends 22 are so cut off as to produce slanting, sharp edges 26 against which a line carried by the holder may be cut, as shown in Figs. 3 and 4. Adjacent the cutting edges 26, the body of the loop is recessed, as at 28, to guide the strand to be cut into position against the cutter and thus to facilitate the cutting operation, particularly when the line to be cut is somewhat thick.

In use, one end 30 of any desired line is suitably tied to the inner portion 31 of one of the loops, or the end of the line may be retained in position by being passed between one of the main loops 10 and 12 and the contiguous portion of the S-shaped member in the vicinity of the point 18, so as to be yieldably clamped between the loop and the adjacent position of the S-shaped member. The line is then wound on the holder, in end over end fashion, by alternately passing it through the passages 32 between the U-shaped members 16 and 20. It will be noted that the passages 32 diverge outwardly, this presenting an enlarged opening which facilitates the winding of the line. The line may be wound to any desired extent, as for example, to the extent indicated at 34, or more or less. When it is desired to use the line, as for example, to drop a plumb line, the line is unwound through the passages 32 to the desired extent.

When it is desired to cut the line, the portion to be cut is guided to approximately the position shown in Figs. 3 and 4 in which the line extends across the edge of the cutter 26. By the arrangement of the cutting edge 26 so that it slants towards and abuts the body of the adjacent loop, as at 24, and by providing the guiding recess 28, the cutting of the line is greatly facilitated.

When the holder is not in use, the line can be secured against unreeling by tacking the free end thereof between either of the main or auxiliary loops and an adjacent abutting surface, as for example, at the point 18.

From Fig. 2 it will be seen that, while the passages 32 are always open, the line can not pay out to an appreciable extent merely because the holder is dangled freely from the line. This is due to the relatively small size of the openings and to the fact that, if the line is paid out from a coil thereof located to either side of a line bisecting the openings 32, the line will engage the wall of the loop 10 or 12 to one side or the other of such line, as illustrated in Fig. 2. Also, even when the line is, momentarily, paid out from a central coil which is in alignment with the passages 32, the line will, after paying out to the extent of one coil or less, again engage one or the other of the walls of the loops 10 and 12, to either side of the median line thereof. This is due to the uneven winding of the line or to intended or unintended inaccuracy in the manufacture of the holder. In other words, unless great care is exercised to make it so, the mass on one side of a line bisecting the openings 32 will, in all probability, have a greater or lesser weight than the mass on the other side of said line. Therefore the line will not unreel from the holder by mere suspension of the holder from the line.

The always open passages 32 make intended paying out of the line very easy and almost instantaneous. Also, it makes it possible to reel the line in or to pay it out with one hand.

It will thus be seen that I have produced a rigid, light and inexpensive line holder which can be easily made by taking a length of wire, cutting the ends at an angle so as to produce the cutting edges, and then bending the wire to form end loops having permanent openings for permitting egress and ingress of the line into the loops, with or without the formation of the auxiliary loops 20 for positioning the cutting edges, as shown.

Having described my invention, what I claim is:

1. A line holder including a body member, and open loops at the opposite ends of said body member, the openings in said loops being relatively small and being disposed near the extremities of said body member and the closed portions of said loops being disposed in juxtaposition to the central portion of said body member, said body member being made of wire and the end of said wire being beveled to provide cutting edges and being so bent as to cause said cutting edges to abut against the adjacent portions of said loops.

2. A line holder including a body member, and loops at the opposite ends of said body member, said loops being disposed inwardly of the ends of said body member and having openings formed therein near the respective ends of said body member, the inner closed portions of said loops being disposed in juxtaposition near the central portion of said body member, the ends of said loops being bevelled to form cutting edges and being bent so that the cutting edges abut the adjacent portions of the loops, there being recesses formed in said adjacent portions of said loops near the abutment points of said cutting edges.

PAUL M. D'AMICO.

REFERENCES CITED

The following references are of record in the file of this patent:

UNITED STATES PATENTS

| Number | Name | Date |
|---|---|---|
| 594,989 | Finn | Dec. 7, 1897 |
| 1,035,825 | Hesser | Aug. 13, 1912 |
| 1,050,118 | Farrell | Jan. 14, 1913 |
| 1,178,056 | Craig | Apr. 4, 1916 |
| 2,371,756 | Gomberg | Mar. 30, 1945 |

FOREIGN PATENTS

| Number | Country | Date |
|---|---|---|
| 351,677 | France | July 22, 1905 |